US008387365B2

(12) United States Patent
Thouvenel et al.

(10) Patent No.: US 8,387,365 B2
(45) Date of Patent: Mar. 5, 2013

(54) METHOD AND DEVICE FOR THE CONTROL OF THE OPERATING STATE OF THE CATALYTIC CONVERTER OF THE EXHAUST LINE OF AN INTERNAL COMBUSTION ENGINE

(75) Inventors: Nicolas Thouvenel, Ballancourt sur Essonne (FR); Nicolas Fabre, Paris (FR); Baptiste Edeline, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 622 days.

(21) Appl. No.: 12/595,271

(22) PCT Filed: Mar. 28, 2008

(86) PCT No.: PCT/FR2008/050551
§ 371 (c)(1),
(2), (4) Date: Jan. 26, 2010

(87) PCT Pub. No.: WO2008/129224
PCT Pub. Date: Oct. 30, 2008

(65) Prior Publication Data
US 2010/0162687 A1   Jul. 1, 2010

(30) Foreign Application Priority Data

Apr. 13, 2007 (FR) ..................... 07 54456

(51) Int. Cl.
*F01N 3/00* (2006.01)
*F01N 3/10* (2006.01)
(52) U.S. Cl. ............... 60/277; 60/285; 60/286; 60/299; 60/303
(58) Field of Classification Search ........... 60/274, 60/277, 285, 286, 295, 299, 300, 303
See application file for complete search history.

(56) References Cited

U.S. PATENT DOCUMENTS

| 5,177,463 | A | * | 1/1993 | Bradshaw et al. | 340/438 |
| 5,610,844 | A | | 3/1997 | Maus et al. | |
| 5,751,602 | A | | 5/1998 | Maus et al. | |
| 5,938,715 | A | | 8/1999 | Zhang et al. | |
| 6,357,225 | B1 | * | 3/2002 | Tanaka | 60/277 |
| 6,408,616 | B1 | | 6/2002 | Mazur et al. | |
| 6,487,852 | B1 | * | 12/2002 | Murphy et al. | 60/286 |
| 7,257,941 | B1 | * | 8/2007 | Reuter | 60/277 |
| 2007/0010020 | A1 | | 1/2007 | Elfvik et al. | |

FOREIGN PATENT DOCUMENTS

| DE | 101 33 944 | | 1/2002 |
| DE | 10201329 A1 | * | 8/2003 |
| EP | 1 052 385 | | 11/2000 |
| EP | 1 323 905 | | 7/2003 |
| FR | 2 761 732 | | 10/1998 |
| WO | 2004 109072 | | 12/2004 |

OTHER PUBLICATIONS

Hannbeck, English Abstract of DE 10201329 A1, Aug. 7, 2003.*

* cited by examiner

*Primary Examiner* — Kenneth Bomberg
*Assistant Examiner* — Audrey K Bradley
(74) *Attorney, Agent, or Firm* — Oblon, Spivak, McClelland, Maier & Neustadt, L.L.P.

(57) ABSTRACT

A device for controlling the operating state of a catalytic converter in the exhaust line of an internal combustion engine, including a mechanism for determining the temperature upstream and downstream of the converter, a mechanism for injecting fuel in the exhaust line of the engine, a mechanism for calibrating a temperature model on a measured operating temperature of the catalytic converter, and a mechanism for calculating the integral of the difference between the measured temperature and the modeled temperature downstream of the converter.

15 Claims, 3 Drawing Sheets

METHOD AND DEVICE FOR THE CONTROL OF THE OPERATING STATE OF THE CATALYTIC CONVERTER OF THE EXHAUST LINE OF AN INTERNAL COMBUSTION ENGINE

BACKGROUND

The present invention relates to the field of the treatment of the exhaust gases of an internal combustion engine, for example of a motor vehicle. The internal combustion engine may be a lean-burn engine, particularly a diesel or gasoline engine.

More particularly, the invention relates to the field of checking the operating state of a catalytic converter with which the exhaust line is provided.

Internal combustion engines produce exhaust gases which contain polluting substances such as oxides of nitrogen, unburned hydrocarbons and carbon monoxide, that have to be treated before the gases are released into the atmosphere.

Motor vehicles are often fitted with a catalytic converter arranged in the exhaust line of the engine, able to oxidize the carbon monoxide and the unburned hydrocarbons.

Motor vehicles are also generally fitted with a device for checking the operating state of the catalytic converter, making it possible to check that the catalytic converter is operating correctly and alert the driver to any malfunction.

Of the causes of malfunctions, ageing of the catalytic converter leads to a drop in the efficiency with which the unburned hydrocarbons and the carbon monoxide are converted into water and carbon dioxide, this drop being due, amongst other things to a reduction in the active surface area for the treatment of the pollutants in the catalytic converter. This then results in an increase in the light-off temperature for the oxidation reactions, particularly in the temperature above which the conversion efficiency is greater than or equal to 50%.

Document EP-1 323 905 (RENAULT) proposes a method of checking the operating state of a catalytic converter of an exhaust line of an internal combustion engine with the converter energized by injecting fuel and checking the value of a variable representative of the amount of heat given off by an oxidation reaction within the catalytic converter, by monitoring the operating temperature of the catalytic converter and injecting fuel at a temperature corresponding to a light-off temperature of a catalytic converter that is operating correctly.

BRIEF SUMMARY

The invention is aimed at improving the check on the operation of an exhaust line catalyst.

The invention proposes to check the operating state of a catalytic converter particularly reliably and accurately.

The method for checking the operating state of a catalytic converter of an exhaust line of an internal combustion engine, involves energizing the converter by injecting fuel into the exhaust line and checking the value of a variable representative of the amount of heat given off by an oxidation reaction within the catalytic converter. A temperature model is calibrated on a measured operating temperature of the catalytic converter. Fuel is injected if operating conditions are met. The integral of the difference between the measured temperature and the modeled temperature downstream of the converter is calculated. The value of the integral is representative of the operating state of the catalytic converter.

In one embodiment, the method involves comparing the integral of the difference between the measured temperature and the modeled temperature downstream of the converter over a test period against a threshold value in order from this to deduce a diagnosis regarding the operating state of the catalytic converter.

In one embodiment, the threshold value is a threshold value that can vary as a function of the operating conditions of the engine.

In another embodiment, the threshold value is a value that is fixed for an operating point of the engine.

In one embodiment, if the operating conditions are not met during injections of fuel, the check is declared negative.

In one embodiment, the operating conditions during the injection of fuel include satisfactory operation of the main fuel injectors or of an injector injecting fuel into the exhaust, satisfactory operation of a fuel feed pump and satisfactory operation of temperature sensors. It thus becomes possible to have data representative of the operation of the catalytic converter.

In one embodiment, the operating conditions during the injection of fuel include a converter temperature higher than the light-off temperatures of the converter when new and of the converter in the degraded state, and lower than a high temperature at which a converter in the degraded state operates in a way close to that of a converter when new. The amount of fuel injected falls within range.

In one embodiment, the injection of fuel into the exhaust line is performed by an injector delivering between the cylinders of the engine and the converter. This means that the hydrocarbons vaporized by said injector pass via the catalytic converter. The amount of fuel injected can be reduced. The checking period can be shortened.

In one embodiment, the temperature is measured upstream of the converter and filtering is applied to the temperature with a view to modeling the temperature that an inert catalytic converter (containing no catalytic phase) would have at its outlet. The filtering may be a function of the exhaust mass flow rate, with or without a delay.

In one embodiment, while fuel is being injected, the mass flow rate of unburned hydrocarbons is kept constant at the inlet to the catalytic converter.

The device for checking the operating state of a catalytic converter of an exhaust line of an internal combustion engine, includes means of determining the temperature upstream and downstream of the converter, means for injecting fuel into the exhaust line of the engine, means of calibrating a temperature model on a measured operating temperature of the catalytic converter, and means of calculating the integral of the difference between the measured temperature and the modeled temperature downstream of the converter. The means of determining the prevailing temperature upstream and downstream of the converter may comprise a sensor positioned upstream of the converter and an estimator of the temperature downstream of the converter.

In one embodiment, the device is carried on board a vehicle.

In another embodiment, the device comprises a test tool distinct from the vehicle, the test tool including the calibration means of the calculation means.

Thanks to the invention, the operating state of a catalytic converter can be checked in a way that is effective and can be adapted to suit different types of vehicles. The check can be performed on a vehicle that is stationary, with the engine running, to which a diagnostic tool is connected.

BRIEF DESCRIPTION OF THE DRAWINGS

The present invention will be better understood from studying the detailed description of a number of embodiments taken by way of entirely nonlimiting examples and illustrated by the attached drawings in which.

DETAILED DESCRIPTION

Figure 1:
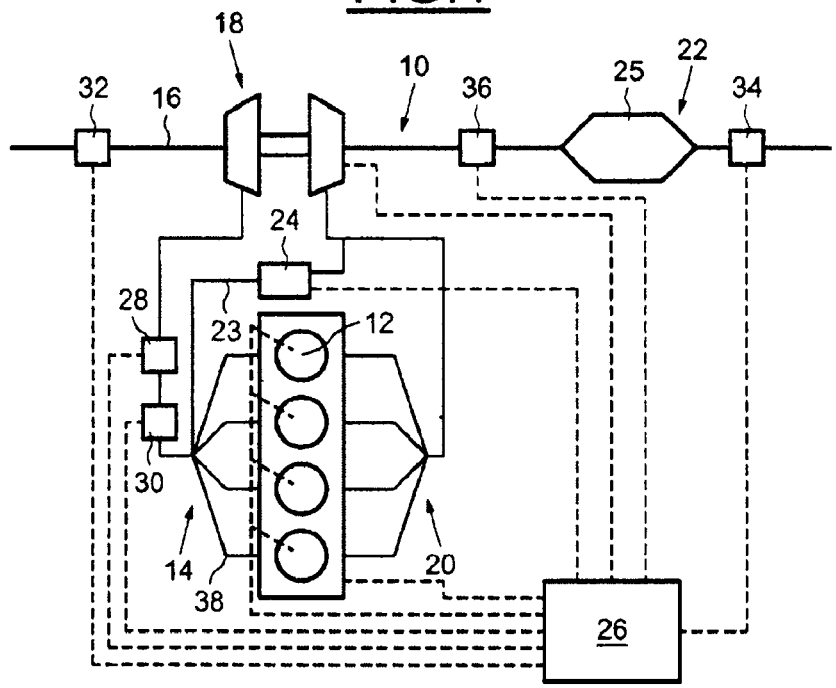
FIG. 1 is a schematic view of an internal combustion engine equipped with an exhaust line provided with a catalytic converter associated with a checking device.

As can be seen in FIG. 1, an internal combustion engine 10 is provided with four cylinders arranged in-line. The cylinders 12 are supplied with air from an air intake manifold 14, itself supplied by a pipe 16 provided with an air filter (not depicted) and with a turbocompressor 18 for supercharging the air supplied to the engine.

An exhaust manifold 20 collects the exhaust gases resulting from combustion and discharges them to the outside via the turbine of the turbocompressor 18 and via an exhaust line 22.

An exhaust gas recirculation circuit 23 comprising part of the engine air supply circuit and part of the exhaust circuit is configured to recover some of the exhaust gases and reinject them into the intake manifold 14 to limit the amount of nitrogen oxides produced by the combustion while at the same time avoiding the formation of smoke in the exhaust gases. The recirculation circuit 23 may include a valve 24 for regulating the flow of the recirculated exhaust gases.

The exhaust line 22 comprises a particulate filter (not depicted) and a catalytic converter 25 that oxidizes the reducing molecules, particularly carbon monoxide CO and unburned hydrocarbons HC.

The catalytic converter 25 may be of the conventional type and will therefore not be described in detail in what follows. The catalytic converter 25 may have a monolithic structure. The catalytic converter 25 may be provided with channels impregnated with a catalytic phase, for example a precious metal, and having a large surface area for contact with the exhaust gases.

The monolith involved in the construction of the catalytic converter 25 may be incorporated into the particulate filter or into a NOx trap. It is thus possible to achieve coupling between the post-treatment of the exhaust gases by oxidation of the carbon monoxide and of the unburned hydrocarbon HC and the post-treatment of particulates and oxides of nitrogen NOx.

The engine 10 comprises an on-board computer 26 capable of checking the operation of the said engine 10, particularly of regulating its operating parameters and of checking the operation of the catalytic converter 25.

The engine 10 may be provided with a boost pressure sensor 28, with a sensor 30 that senses the air intake temperature into the air intake manifold 14 and with a flow rate sensor 32 positioned in the feed line 16. These sensors and the main functional components of the engine and of the air supply circuit are connected to the computer 26.

The computer comprises memory storage means in which a collection of data obtained by a prior learning stage and particularly corresponding to threshold values for the detection of malfunctions are stored and software means of checking the amount of heat given off by the chemical reaction generated by the post-injection within the catalytic converter by comparison against threshold values.

The device also comprises a sensor 34 for measuring the temperature of the exhaust gases downstream of the converter 25, previously positioned in the gas flow and as close as possible to the converter 25, and a sensor 36 for measuring the temperature of the exhaust gases upstream of the converter 25. The sensors 34 and 36 are connected to the computer 26. The sensors 34 and 36 may comprise thermistors.

In the embodiment illustrated in FIG. 1, the injection of fuel performed in order to check the operating state of the catalytic converter is performed by the injectors 38 designed to inject fuel into the cylinders 12. The injectors 38 are also controlled by the computer 26.

Figure 2:
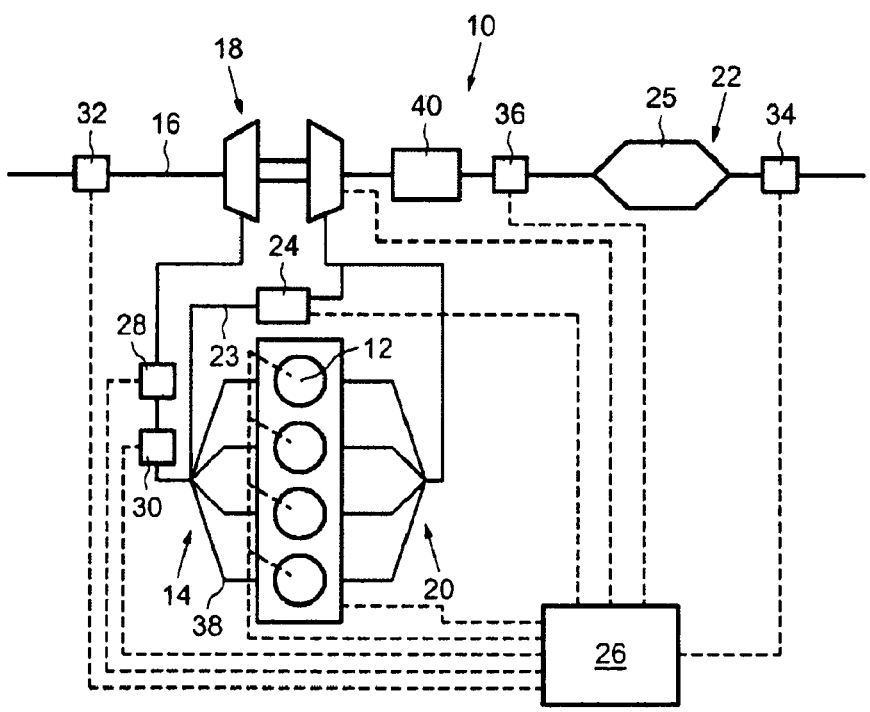
FIG. 2 is an alternative form of FIG. 1.

In the embodiment illustrated in FIG. 2, the device comprises an additional injector 40 positioned between the turbine of the turbocompressor 18 and the sensor 36 upstream of the converter 25. The additional injector is capable of injecting fuel, for example in vaporized form, into the stream of exhaust gases. The additional injector 40 makes it possible, temporarily during a checking test, to increase the amount of unburned hydrocarbons in the exhaust gases.

Figure 3:
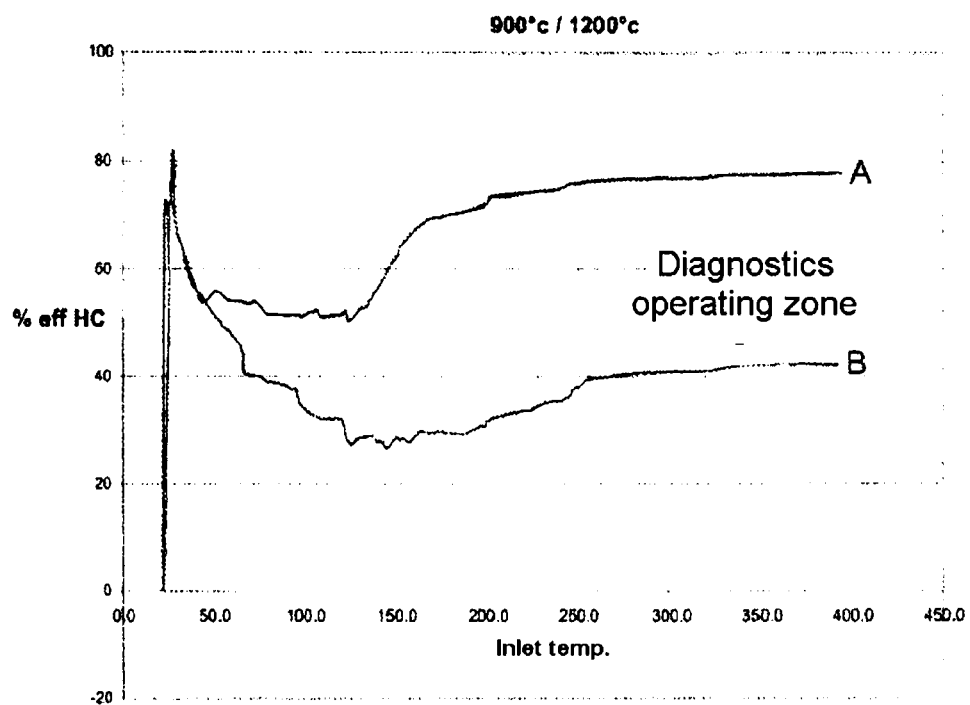
FIG. 3 shows a curve of the level of efficiency in converting unburned hydrocarbons as a function of temperature, thus defining a preferred operating zone for the check.

FIG. 3 illustrates two curves representative of the level of conversion of unburned hydrocarbons as a function of inlet temperature. Curve A, or the upper curve, is representative of the operation of a catalytic converter in good condition. Curve B, or the lower curve, is representative of the operation of a catalytic converter in poor condition. It can be seen that, upwards of a temperature of the order of 250°, curves A and B display a relatively stable monotonous slightly increasing zone with a substantially constant separation of the order of 30 to 40 points between the conversion efficiency of the catalytic converter in good condition, which varies between 75 and 80%, and the efficiency offered by the catalytic converter in poor condition, which is of the order of 40 to 45%. This zone lies between the temperatures of the order of 250 to 400°. At lower temperatures, for example of the order of 150 to 250°, the separation between the curves A and B may be even greater still. Nonetheless, the sharper variations in level of efficiency make diagnostic possible, but slightly more difficult. A catalytic converter temperature higher than 250° will therefore preferably be chosen by way of an operating condition for the checking method.

Figure 4:
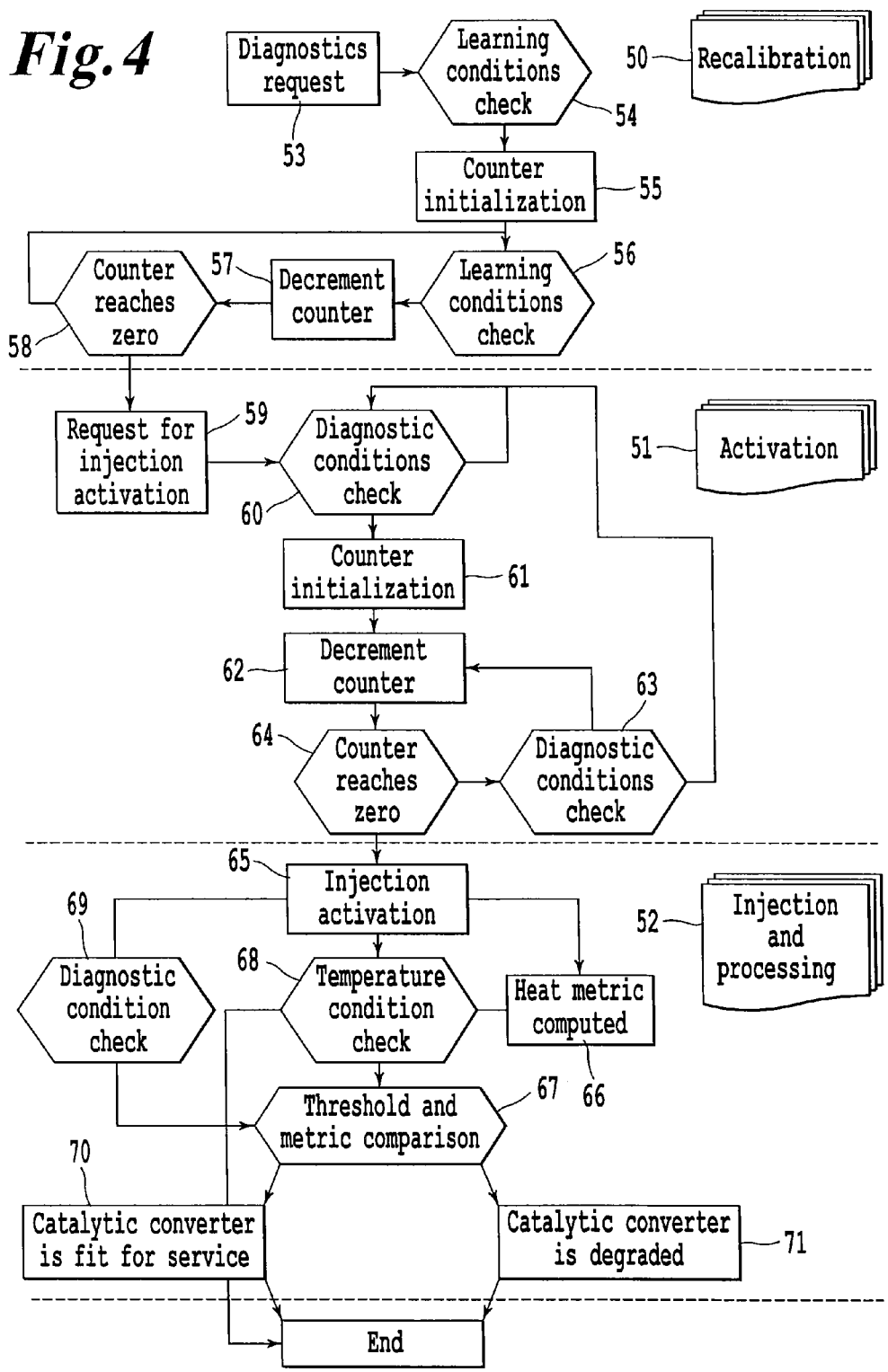
FIG. 4 is a flow diagram of the operating steps.

As illustrated in FIG. 4, the method involves three main steps these respectively being the steps of recalibration 50, of activation 51, of late injection and of processing 52 of the thermal information. The first step 50 allows the modeled temperature to be recalibrated on the measured temperature in order to measure only a relative separation during the late-injection sequence on receipt of a diagnostics request 53. The step 50 also makes it possible to erase any spread on the system temperature sensors. The first step 50 allows the difference between a modeled temperature and a measured temperature to be stored in memory for a given sensor. This difference can then be reintegrated in order to construct the temperature modeled in the third step. The first step 50 involves verifying learning conditions 54, for example engine operating range, stability of the separation between the temperature modeled downstream of the converter and the temperature measured downstream of the converter, initializing 55 a counter, verifying learning conditions 56 which may be similar to the learning conditions 54 allowing the counter to be decremented 57 and then, when the counter reaches zero 58, progressing to the second step 51 by generating a request 59 to activate late injection. In other words, satisfactory input conditions are verified during the period between initialization 55 and zeroing 58.

The second step 51 of activating late injection is begun after parameters characteristic of the operation of the engine and of the catalytic converter have been verified, these notably being the temperature at the ends of the converter, the mass flow rate of the exhaust gases, etc. Verification of these parameters known as "diagnostics conditions" makes it possible to ensure a certain stability of the parameters during the diagnostics and thus repeatability of the diagnostics. The diagnostics conditions 60 have to remain satisfactory for a determined period counted down by a counter that is initialized 61 and counts down 62. As long as the counter has not reached zero, the diagnostics conditions are verified again through a test 63.

Injection is commanded when the counter reaches zero according to a test 64. Injection is activated in step 65. More specifically, provision may be made for temperature conditions of the catalytic converter to be complied with. The temperature of the catalytic converter has to be higher than the light-off temperatures of a catalytic converter in good condition and of a degraded catalytic converter to be discerned. The temperature of the catalytic converter needs to fall within the diagnostics zone embodied in FIG. 3, for example ranging between 250 and 400° C. The amount of fuel injected late has to be sufficient for the efficient catalytic converter to be clearly distinguished from the degraded catalytic converter. The amount of post-injected fuel needs to be lower than an upper ceiling value in order not to inhibit the catalytic conversion reaction by poisoning the catalytic phase, for example by having too high a concentration of hydrocarbons upstream of the catalytic converter.

Furthermore, if the catalytic converter has the ability to store hydrocarbons when cold, it is preferable to ensure that the hydrocarbons stored when cold have been removed from storage beforehand. If they have not, control over the amount of hydrocarbons participating in the reaction will be compromised and there would therefore be a risk of this diagnostics declaring a degraded catalytic converter to be sound. A condition on the inlet and/or outlet temperature of the catalytic converter makes it possible to obviate this risk.

In one embodiment, the mass flow rate of unburned hydrocarbons is kept constant upstream of the catalytic converter for the duration of the late injection. The late injection is halted when a stop-test criterion is encountered, for example if the driver lifts his foot off the throttle. If the downstream temperature measured by the sensor 34 leaves the intended range, the test is stopped. If not, the test is continued. The quantity injected can be modulated by the engine speed and possibly by the level of exhaust gas recirculation, according to the following equation:

$$Q_{inj} = \frac{constant}{(1 - \tau_{EGR}) \times n}$$

where n is the engine speed and $\tau_{EGR}$ is the level of exhaust gas recirculation.

In another embodiment, the exhaust gas recirculation valve 24 is closed during step 2. In this case, the quantity injected is a function of engine speed according to the following equation:

$$Q_{inj} = \frac{constant}{n}$$

The third step 52 of processing the thermal information may begin at the same time as the late injection. The third step 52 returns an elementary diagnostic result. The computer 26 calculates 66 the criterion: the integral over the test period of the difference between the measured temperature and the modeled temperature downstream of the converter, using:

$$\int_{testperiod}(T_{meas} - T_{mod})dt$$

The value thus calculated is then compared in step 67 against a threshold. The result of the comparison determines whether the catalytic converter 25 is providing a satisfactory level of depollution. The catalytic converter 25 is declared fit for service 70 or degraded 71 with a corresponding display, for example on the vehicle instrument panel.

According to one particular embodiment, a number of thresholds may be recorded in a map which is dependent on the parameters of the catalytic converter, particularly the temperature upstream, the temperature downstream, the mass flow rate of the gases, the quantity of hydrocarbons injected, etc.

In another embodiment, the diagnostics are established for a given engine operating point. Conditions for entering the diagnostic phase have therefore to be verified for a fixed length of time before beginning the second step of post-injection.

In one embodiment, following the start of the test, certain operating conditions such as the parameters of the engine and of the catalytic converter are monitored for the period of the test. These operating conditions make it possible to ensure that the test runs in accordance with its specification. When these conditions are not met, the test is declared to have failed and no test result is provided at output. The operating conditions may be verified by a test on temperature 68, see also FIG. 3.

A model of an inert catalytic converter can be used by the computer in order to constantly estimate the temperature that would prevail at the outlet of an inert catalytic converter. This model receives at input the input variables such as the inlet temperature and the mass flow rate of the exhaust and returns at output the modeled outlet temperature of the catalytic converter. The information regarding the temperature upstream of the converter may be filtered by a first-order filter, the time constant of which is determined by a map dependent on the mass flow rate of the exhaust.

In another embodiment, the time constant of the filter is determined beforehand and remains fixed.

At the output from the filter, the signal is delayed by a period which depends on the mass flow rate of the exhaust gases. Finally, the offset in temperature learned during the first step is added to the temperature resulting from the first two processing operations. This then yields the modeled outlet temperature of the converter.

To ensure that the diagnostics operate correctly, the computer 26 ensures that the injector is operating correctly, that the fuel feed pump is operating correctly, that the system injecting fuel into the exhaust, if present, is operating correctly, that the temperature sensors upstream and downstream of the catalytic converter are operating correctly, and that the exhaust gas recirculation is being regulated correctly. These stop-diagnostics criteria may be subject to a test 69, performed in parallel with the test 68 and with the calculation 66.

More specifically, the checking method may be carried out when the vehicle is stationary with the engine running. To this end, a diagnostics tool, distinct from the vehicle and which can be connected thereto, for example via a diagnostics connector, may be provided. In such a case, the three steps of the method are controlled by the test tool, the test tool comprising the means of calibrating the temperature model, the means of calculating the integral of the difference between the measured temperature and the modeled temperature downstream of the converter and the means for controlling the injection of fuel via the computer 26.

In other words, the modeling of the outlet temperature of the converter is calibrated to a measured temperature. A check is performed to ensure that the conditions necessary for the diagnostics are met. If they are, an additional injection of fuel is activated, either a late injection by the injectors of the cylinders at injection phases that create no torque, for example at a crank angle in excess of 90°, or by implementing an additional injector or vaporizer positioned outside the cylinders, for example on the exhaust manifold and which may also possibly serve to assist with regenerating a particulate filter. During the additional injection, the burnt gases recirculation valve may be forced into the closed position or kept in an operating state. The additional injection is performed over a determined period. At the same time, the temperature is measured and the integral of the difference between the measured temperature and the estimated temperature downstream of the converter is calculated. When the value resulting from the calculation of the integral is higher than a threshold value, the converter is declared fit for service. If not, the catalytic converter is declared to be degraded.

This then yields a particularly effective check on the level of depollution provided by a catalytic converter.

The invention claimed is:

1. A method for checking an operating state of a catalytic converter of an exhaust line of an internal combustion engine, comprising:
    energizing the converter by injecting fuel into the exhaust line;
    checking the value of a variable representative of the amount of heat given off by an oxidation reaction within the catalytic converter;
    calibrating a temperature model on a measured operating temperature of the catalytic converter;
    injecting fuel when operating conditions are met; and
    calculating an integral of a difference between a measured temperature downstream of the catalytic converter and a modeled temperature downstream of an inert catalytic converter.

2. The method as claimed in claim 1, in which the operating conditions during the injection of fuel include satisfactory operation of a main fuel injector or of an injector injecting fuel into the exhaust, satisfactory operation of a fuel feed pump, satisfactory operation of temperature sensors, at least one of either a catalytic converter temperature higher than light-off temperatures of the catalytic converter when new and of the catalytic converter in a degraded state, and lower than a high temperature at which a catalytic converter in the degraded state operates in a way close to that of a catalytic converter when new, or the amount of fuel injected is always within a range.

3. The method as claimed in claim 1, in which the injection of fuel into the exhaust line is performed by an injector delivering between cylinders of the engine and the catalytic converter.

4. The method as claimed in claim 1, in which a calibration temperature used to calibrate the temperature model is measured upstream of the catalytic converter and filtering is applied to said calibration temperature, the filtering being a function of exhaust mass flow rate, with or without a delay.

5. The method as claimed in claim 1, in which, while fuel is being injected, mass flow rate of unburned hydrocarbons is kept constant at an inlet to the catalytic converter.

6. The method as claimed in claim 1, in which the calibrating the temperature model requires verification of an operating range for the engine, and stability of the difference between the temperature measured downstream of the catalytic inert converter and the temperature modeled downstream of the catalytic converter.

7. The method as claimed in claim 1, in which the injecting fuel into the exhaust line is performed by at least one injector of at least one cylinder of the engine at an injection phase that creates no torque.

8. The method as claimed in claim 1, in which, the amount of fuel being injected $Q_{inj}$, can be modulated by engine speed n and the level of exhaust gas recirculation $\tau_{EGR}$, according to the following equation:

$$Q_{inj} = \frac{\text{constant}}{(1 - \tau_{EGR}) \times n}.$$

9. The method as claimed in claim 1, further comprising: declaring a test on the operating state of the catalytic converter to have failed when at least one of the operating conditions is not met, and no test result is provided at output.

10. The method as claimed in claim 1, further comprising comparing the integral of the difference between the measured temperature downstream of the catalytic converter and the modeled temperature downstream of the inert catalytic converter over a test period against a threshold value in order to deduce a diagnosis regarding an operating state of the catalytic converter.

11. The method as claimed in claim 10, in which the threshold value is a threshold value that can vary as a function of the operating conditions of the engine, or a value that is fixed for an operating point of the engine.

12. A device for checking an operating state of a catalytic converter of an exhaust line of an internal combustion engine for implementing a method for checking an operating state of a catalytic converter of an exhaust line of an internal combustion engine, comprising:
    means for measuring temperature upstream and downstream of the catalytic converter;
    means for injecting fuel into the exhaust line of the engine;
    means for calibrating a temperature model on a measured operating temperature of the catalytic converter; and
    means for calculating the integral of the difference between the measured temperature downstream of the catalytic converter and the modeled temperature downstream of an inert catalytic converter.

13. The device as claimed in claim 12, wherein at least part of the device is distinct from the vehicle.

14. The device as claimed in claim 12, wherein the means for injecting include at least one injector to inject fuel into at least one cylinder.

15. The device as claimed in claim 14, wherein the means for injecting include an additional injector between engine cylinders and the catalytic converter.

* * * * *